F. FOSTER.
SHOCK ABSORBER.
APPLICATION FILED NOV. 26, 1915.
1,189,084.  Patented June 27, 1916.
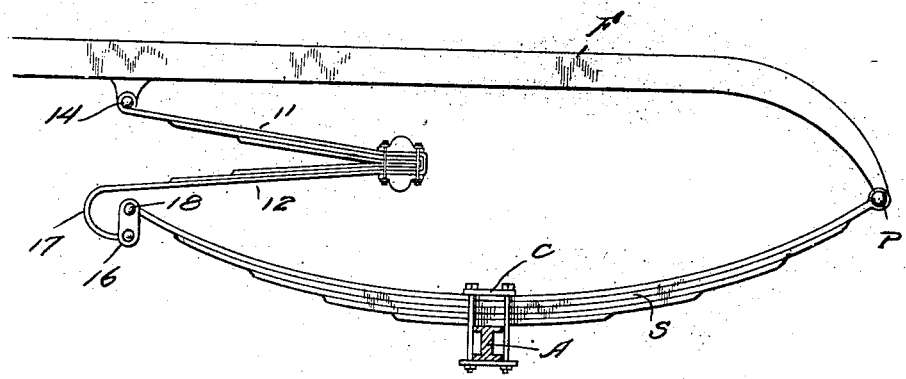
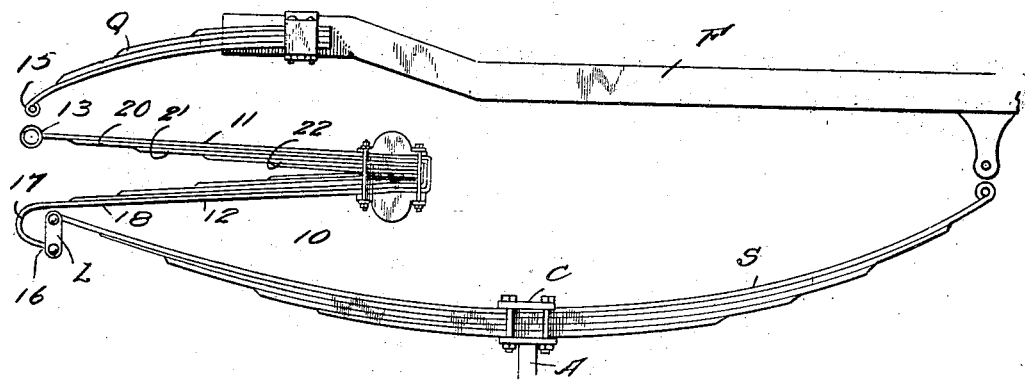
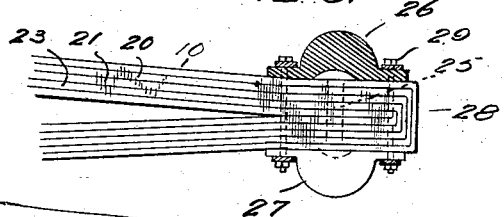
Inventor
Fred Foster

UNITED STATES PATENT OFFICE.

FRED FOSTER, OF SCRANTON, PENNSYLVANIA.

SHOCK-ABSORBER.

1,189,084.　　　　　Specification of Letters Patent.　　Patented June 27, 1916.

Application filed November 26, 1915. Serial No. 63,570.

*To all whom it may concern:*

Be it known that I, FRED FOSTER, a citizen of the United States, residing at Scranton, in the county of Lackawanna and State of Pennsylvania, have invented certain new and useful Improvements in Shock-Absorbers; and I do hereby declare the following to be a full, clear, and exact description of the invention, such as will enable others skilled in the art to which it appertains to make and use the same.

The present invention is a shock absorber in the nature of a supplemental spring, intended for application to the spring already in use on a vehicle, and in the accompanying drawings and following specification I have shown and described it as applied to an automobile spring.

The purpose of the invention is to provide an extremely cheap and simple shock absorber which can be applied without special tools or expert knowledge, and which when in place takes much of the shock off the springs while producing little if any increase in the possibilities for longitudinal and lateral movements of such spring.

Details are set forth in the following specification and illustrated in the drawings wherein:

Figure 1 is a side elevation of this device as applied to a semi-elliptical spring at the front of an automobile frame. Fig. 2 is a side elevation showing the application of this device at the rear of such a frame and to a three-quarter elliptical spring, the parts being slightly disconnected in this view. Fig. 3 is an enlarged section through the center of the shock absorbing spring itself.

While this shock absorber is applicable in a variety of places, I intend it and have shown it as applied to the spring S beneath an automobile frame F, and one end of this spring is connected at P to a fixed pivot on the frame while ordinarily the other end of the spring is connected with the frame by a shackle such as a pair of links L, so that this end of the spring has a swinging movement. In Fig. 2 the letter Q designates the third quarter of the entire main spring, its inner end being connected with the frame and its outer end carrying an eye in which we can assume that the links L were pivoted before my invention was applied. While it is true that the outer end of this spring Q has a slight oblique movement under pressure, yet the swinging support of the main spring S is due to the presence of the links and the connection Q between the upper ends of the links and the frame F might be said to be a fixed pivot as much as the connection shown at P. As shown herein, the axle A is connected by a clip C with the center of the spring. No novelty is claimed for the parts thus far described.

My improved shock absorber is itself a spring 10 of reëntrant or V-shaped construction having an upper arm 11 and a lower arm 12, both of which carry eyes at their extremities. When the upper eye 13 is connected with the eye of a bracket 14 on the frame F or with the eyes 15 at the outer end of the spring Q, and the lower eye 16 is connected to the pivot at the lower end of the shackle or links L, this spring 10 is in place; and in order that it will not come in contact with a semi-elliptical spring as shown at S, I carry its lower arm 12 out beyond its upper eyes 13 and curve it over and downward as at 17 so that ample space is left for the pivotal point 18 between the upper end of the shackle and the extremity of the spring S. While a single spring 10 may be employed for light vehicles, the shock absorber may include a number of leaves as shown at 20, 21 and 22, and by preference these are V-shaped and are nested within each other as best seen in Fig. 3. Their angles should be connected in some proper way, as by the bolt or rivet 25, and this inner or reëntrant end of the entire shock absorber stands between the frame F and the spring S and preferably in a single vertical plane with such members.

The application of this improved shock absorber is obvious and easy. One end of the spring S is disconnected from the eye at 14 or 15, the links of the shackle turned downward around their pivot 18, the shock absorber inserted in place, and its eyes 13 pivoted to the frame or to the spring Q if one be present, while its eye 16 is pivoted to the shackle. When now a shock occurs and the axle A rises suddenly, much of the first impact of the shock is taken up by the spring 10 and its various leaves. But obviously the main spring S will straighten out to a slight extent and therefore the pivotal point 18 is carried out into the bend 17 so that the tendency will be for the pivotal point 16 to rise obliquely toward the left as shown in the drawings, rather than directly upward as it would do under ordinary circumstances. On the rebound, also, the movement of the main spring may draw the pivotal point 18 inward beyond its ordinary position; and in order that the links composing the shackle may swing uninterruptedly, I have provided the lower arm 12 of the shock absorber spring with the ample bend or curve 17. Occasions will occur, however, when this forward and backward movement of the rear end of the main spring is so excessive that the oblique draft by the shackle on the lower end of the V-shaped spring 10 is sufficient, while its upper end at 13 is connected by a relatively fixed pivot with the frame F, to cause its center or angle to move upward or downward within the space between the frame F and the main spring S. Therefore I have provided this inner end with bumpers, herein shown as rubber blocks 26 and 27 standing above and below the bent inner end 28 of the spring 10, and said blocks may be held in place by any suitable means such as clips 29. I do not wish to be limited at all with respect to these bumpers or in fact, to their use, but if employed I would place them at the inner ends of the reëntrant spring and on its upper and lower sides as shown. When now a sudden shock so distorts the parts that the draft on the shackle is quite oblique, the inner end of the V-shaped spring will be thrown down but the lower bumper 27 will prevent it from injuring the main spring S, and on the rebound of the latter the inner end of the spring S may be thrown up sufficiently to strike the upper bumper 26 against the frame F. Of course the parts could be opened to such an extent that this would not occur, but with the frame and main spring and shock absorber all standing in one plane and set as closely under ordinary circumstances, I consider the use of this bumper a desirable safeguard.

What I claim is:

1. The combination with a vehicle frame, a leaf spring, and a reëntrant spring standing between said elements and with one arm curved around the leaf spring; of a fixed pivot between one end of said leaf spring and the frame, links pivotally connecting its other end with said curved arm of the reëntrant spring and a fixed pivot connecting between the other arm thereof and said frame.

2. The combination with a vehicle frame, and a main spring connected at one end thereto by a fixed pivot; of a V-shaped shock absorbing spring standing between the main spring and frame and with its upper arm pivotally connected with such frame and its lower arm curving around to an eye below the end of the main spring, and a pair of links pivotally connecting said eye and end.

3. The combination with a vehicle frame, an axle, and a leaf spring centrally secured to the axle and connected at its inner end by a fixed pivot to the frame; of a reëntrant shock absorber having its upper end connected by a fixed pivot with the frame and its lower end curved around under the outer end of the spring, and a swinging connection between these ends.

4. The combination with a vehicle frame, an axle, and a leaf spring centrally secured to the axle and connected at its inner end by a fixed pivot to the frame; of a bent shock absorber standing between and in a vertical plane with the frame and spring with its upper end pivotally connected with the frame and its lower end curved around under the outer end of the spring, and a shackle pivotally connecting these ends.

5. The combination with a vehicle frame, and a main spring underlying it; of a V-shaped shock absorber standing between the spring and frame and having its arms connected with them, and a bumper carried by its angle.

6. The combination with a vehicle frame, a leaf spring underlying it, and a V-shaped spring between and in vertical alinement with said elements; of a bumper on the inner end of the V-shaped spring, pivotal connections between one end of each spring and the frame, and swinging connections between the other ends of the springs.

7. The combination with a vehicle frame, and a main spring connected at one end thereto by a fixed pivot; of a V-shaped shock absorber between the spring and frame, pivotal connections between one end thereof and said frame, a link connecting its other end with the other end of said spring, and a bumper carried by its angle.

8. The combination with a vehicle frame, an axle, and a semi-elliptical spring connected at the center with the axle and at one end with said frame; of a shock absorber comprising a V-shaped spring whose upper arm is pivotally connected with the frame and whose lower arm curves around the adjacent end of the semi-elliptical spring, said arm and spring having eyes at their extremities, V-shaped leaves within said V-shaped spring, clips embracing said arms and leaves, bumpers carried by the clips above and below the inner end of the shock absorber, and a shackle pivotally connecting said eyes.

In testimony whereof I affix my signature.

FRED FOSTER.